(12) United States Patent
Shibata et al.

(10) Patent No.: US 6,260,460 B1
(45) Date of Patent: Jul. 17, 2001

(54) MACHINING TOOLS HAVING ADJUSTABLE FENCES

(75) Inventors: Yoshinori Shibata; Hisashi Higuchi, both of Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/371,522

(22) Filed: Aug. 10, 1999

(30) Foreign Application Priority Data

Aug. 11, 1998 (JP) .................................................. 10-227442

(51) Int. Cl.[7] ...................................................... B26D 7/01
(52) U.S. Cl. ..................... 83/468.3; 83/468.7; 83/581; 83/471.3
(58) Field of Search ................................... 83/581, 468.3, 83/468.7, 471, 472, 473, 451, 468.6, 471.3, 462, 461, 467.1, 477, 468, 477.2; 144/287, 216, 135.2, 253.2

(56) References Cited

U.S. PATENT DOCUMENTS

| | | | |
|---|---|---|---|
| 707,675 | * | 8/1902 | Colburn .................................. 83/473 |
| 1,334,070 | * | 3/1920 | Bauer .................................... 144/216 |
| 2,045,422 | * | 6/1936 | Tautz ................................... 144/135.2 |
| 3,672,251 | * | 6/1972 | Jagers .................................. 83/468.3 |
| 3,842,700 | * | 10/1974 | Novak .................................. 83/471.3 |
| 3,964,361 | * | 6/1976 | Allaire .................................. 83/473 |
| 4,245,533 | * | 1/1981 | Batson .................................. 83/473 |
| 4,320,678 | * | 3/1982 | Volk ..................................... 83/581 |
| 4,328,728 | * | 5/1982 | Ferdinand et al. .................... 83/473 |
| 4,567,802 | * | 2/1986 | Witherspoon ......................... 83/581 |
| 5,062,339 | * | 11/1991 | Campos .............................. 83/471.3 |
| 5,191,821 | * | 3/1993 | Metzger, Jr. et al. ................. 83/581 |
| 5,220,857 | * | 6/1993 | Freeburger .......................... 83/471.3 |
| 5,271,305 | * | 12/1993 | Peters et al. .......................... 83/581 |
| 5,473,821 | * | 12/1995 | DiMarco .............................. 83/471.3 |
| 5,483,858 | * | 1/1996 | Chen .................................... 83/581 |
| 5,564,323 | | 10/1996 | Sasaki et al. . |
| 5,664,612 | * | 9/1997 | Klemma .............................. 83/471.3 |
| 5,720,096 | * | 2/1998 | Dorsey ................................ 83/468.3 |
| 5,823,239 | * | 10/1998 | Smith ................................. 144/135.2 |
| 5,967,717 | * | 10/1999 | Tucker et al. ........................ 144/371 |

FOREIGN PATENT DOCUMENTS

1950844   9/1995   (DE) .

* cited by examiner

*Primary Examiner*—Rinaldi I. Rada
*Assistant Examiner*—Omar Flores-Sánchez
(74) *Attorney, Agent, or Firm*—Dennison, Scheiner, Schultz & Wakeman (57) ABSTRACT

A machining tool includes a table, an adjustable fence disposed on the table, a fixing device coupled to the fence and a lever operable by an operator. The fixing device can be operated to fix the fence in position or to permit the movement of the fence relative to the table by the operation of the lever. As a result, a tool is not needed to change the position of the fence relative to the table.

21 Claims, 7 Drawing Sheets

MACHINING TOOLS HAVING ADJUSTABLE FENCES

BACKGROUND OF THE INVENTION

1. Field of the Invention

The present invention relates to machining tools, such as circular saws and hollow chisel mortises, having adjustable fences for positioning a workpiece to be machined.

2. Description of the Related Art

Figure 8:
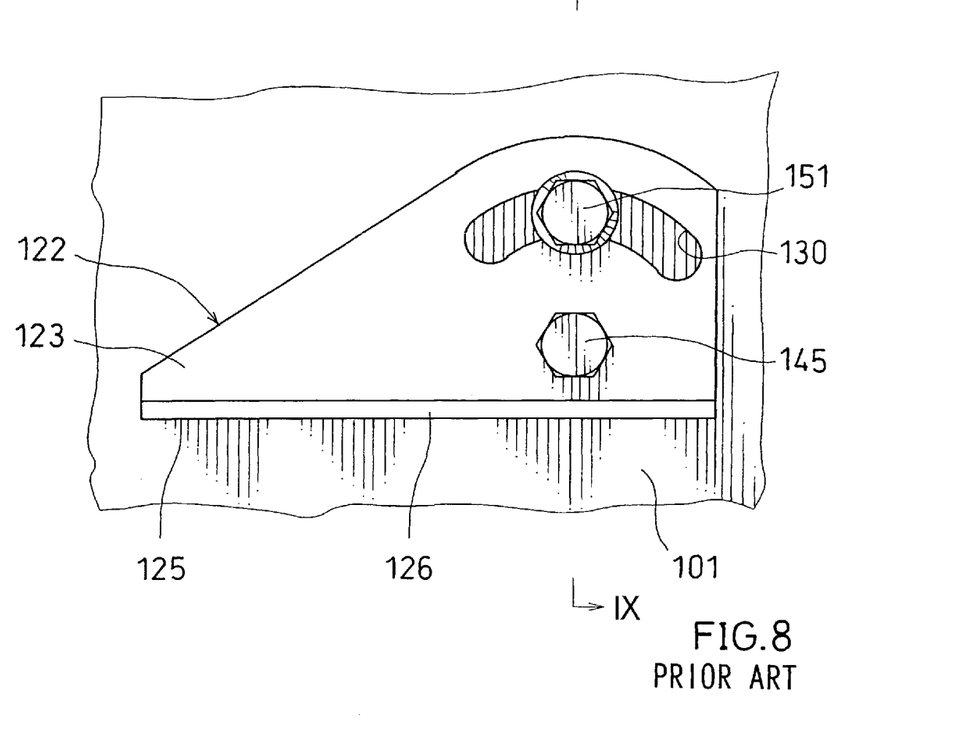
FIG. 8 is a plan view of a known adjustable fence.
Figure 9:
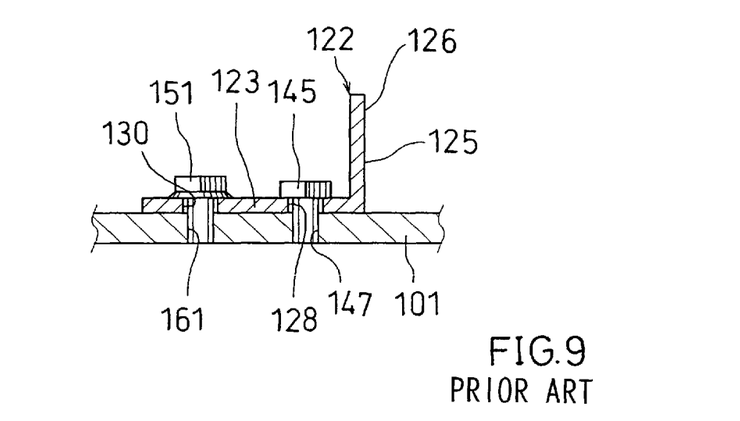
FIG. 9 is a sectional view taken along line IX—IX in FIG. 8.

A known table saw having an adjustable fence is shown in FIGS. 8 and 9. As shown in these figures, a fence 122 is disposed on an upper surface of table 101 and has a flat plate 123 and an upright guide plate 126, which defines a vertical reference surface 125 for positioning the workpiece. The flat plate 123 has an insertion hole 128 formed in the right side portion as viewed in FIG. 8. A guide slot 130 is formed in the flat plate 123 and has an arc-shaped configuration. A first bolt 145 is inserted into the insertion hole 128 and engages a first threaded hole 147 formed in the table 101, so that the fence 122 can pivot about the first bolt 145. A second bolt 151 is inserted into the guide slot 130 and engages a second threaded hole 161 formed in the table 101, so that the fence 122 can be fixed in position relative to the table 101 by tightening the first bolt 151.

In order to change the pivotal position of the fence 122 to perform a "miter cut" operation, the second bolt 151 is loosened using a tool and the fence 122 is pivoted about the first bolt 145. The movement of the second bolt 151 along the guide slot 130 guides the position of the fence 122. After the desired pivoted position has been reached, the second bolt 151 is tightened to fix the fence 122 in the desired pivoted position.

However, in order to change the position of the fence of the known table device, a special tool such as a box wrench is required. In addition, the operator must operate the tool to engage with and disengage from the bolt. Therefore, the known table devices require troublesome operations for changing or adjusting the position of the fence.

SUMMARY OF THE INVENTION

It is, accordingly, one object of the present invention to teach improved machining tools that do not require a tool to adjust the position of the fence.

Preferably, machining tools are taught having a table, an adjustable fence disposed on the table, a fixing device for fixing the position of the adjustable fence and a lever coupled to the fixing device for rotating the fixing device from a fixing position to a releasing position. When the lever is moved to the releasing position, the adjustable fence can freely move relative to the table in order to re-position the adjustable fence. When the lever is moved to the fixing position, the adjustable fence is fixed in position relative to the table. In such a design, a tool is not needed to change the position of the fence relative to the table, thereby simplifying the fence adjusting operation. The lever is preferably disposed below the table, so that the space below the table can be effectively used.

Other objects, features and advantages of the present invention will be readily understood after reading the following detailed description together with the accompanying drawings and the claims.

DETAILED DESCRIPTION OF THE INVENTION

Machining tools are taught having adjustable fences that preferably can be adjusted relative to a table without the use of a tool. Preferably, the adjustable fences are utilized with cutting tools, such as table saw, but such adjustable tools can be utilized with a variety of machining tools. The adjustable fences taught herein are more convenient to use than known adjustable fences, which require a tool to loosen and tighten a fixing device. Such machining tools may include a table, an adjustable fence disposed on the table, a fixing device for fixing the adjustable fence in position and a means for operating the fixing device. The means for operating the fixing device is preferably a lever, which can be operated by hand, although other means for operating the fixing device by hand can be utilized. Preferably, the fixing device can be operated to fix the fence in position or to permit the movement of the fence relative to the table by the operation of the means for operating the fixing device.

Preferably, the means for operating the fixing device is disposed below the table, so that the space below the table can be effectively used. The means for operating the fixing device, such as a lever, preferably pivots between a fixing position for fixing the position of the adjustable fence and a releasing position for permitting free movement of the adjustable fence.

In one representative embodiment, the fixing device may include a first screw member and a second screw member that engages the first screw member. The first screw member may be fixed in position relative to the table. The second screw member may be connected to the means for operating the fixing device. Preferably, the second screw member is rotated by the means for operating the fixing device between a fixing position and a releasing position. For example, in the fixing position the second screw member is tightened to fix the adjustable fence in position. In the releasing position the second screw member is loosened to permit the adjustable fence to move freely.

Preferably, the first screw is a male screw that extends through the fence and the table and has a head that engages the upper surface of the fence. The second screw may be a female screw that engages the male screw below the table and that has an upper end that contacts the lower surface of the table.

If a lever is utilized as the means for operating the fixing device, the lever may also have a means for changing the extending length of the lever. This extending length changing means may permit the lever to be adjusted in position relative to the edge of the table so that the lever can pivot about the fixing device and can be pushed and stored under the table when not in use. A holder may be provided to perform this length changing function and the holder may include a pair of walls opposed in spaced relationship with each other and each including a mounting hole formed therein for supporting the lever and permitting the lever to slide axially with respect to the holder.

Preferably, the lever is disposed below the table and includes a grip that is disposed on the end of the lever that is opposite to the holder. The grip preferably may be grasped with one hand to operate the fixing device. The table also may have at least one sidewall with an opening formed in the sidewall. Preferably, the end of the lever having the grip extends outwardly of the wall through the opening.

The sidewall may include a first inwardly recessed wall part that has a first outer recess with a first bottom. Preferably, when the lever is in the fixing position, the lever extends through the slit and past the first recessed wall part, such that the grip end of the lever is positioned to provide a maximum effective length extending from the first outer recess. The sidewall may further include a second inwardly recessed wall part that is continuously formed with the first recessed wall part that has a second outer recess with a second bottom. Preferably, when the lever in the releasing position, the grip end extends through the opening and past the second inwardly recessed wall. When the lever is in the releasing position, the lever preferably may be moved in the axial direction between a storage position and an extended position by means of the holder. In the storage position, the grip end may be positioned within the second outer recess. In the extended position, the grip end may be positioned outward of the second outer recess.

In another representative embodiment, a resistance device may be provided between the lever and the holder and may cause a suitable resistance to prevent axial movement of the lever when it is in the storage position. Preferably, the resistance device is made of a resilient member, such as rubber, is mounted in the holder and contacts the lateral surface of the lever.

Each of the additional features and method steps disclosed above and below may be utilized separately or in conjunction with other features and method steps to provide improved machining tools and methods for designing and using such machining tools. A representative example of the present invention, which example utilizes many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention.

A representative machining tool 1 is shown in FIGS. 1–7, which in this representative embodiment is a table saw, and may include a table 10 that has a substantially rectangular configuration in plan view. A saw unit support bracket 2 may be fixedly mounted on the rear end (left end as viewed in FIG. 1) of the table 10. A saw unit 5 may be mounted on the upper end of the support bracket 2 so that it can vertically pivot by means of a pivotal shaft 3. A motor 6 may be mounted on the saw unit 5 and may have a motor shaft on which a circular saw blade (chip saw cutter) 8 may be removably mounted by means of a clamp device (not shown). A handle 13 may be mounted on a motor housing 11 with a trigger 12 disposed on the handle 13 for turning the motor 6 on and off.

Figure 1:
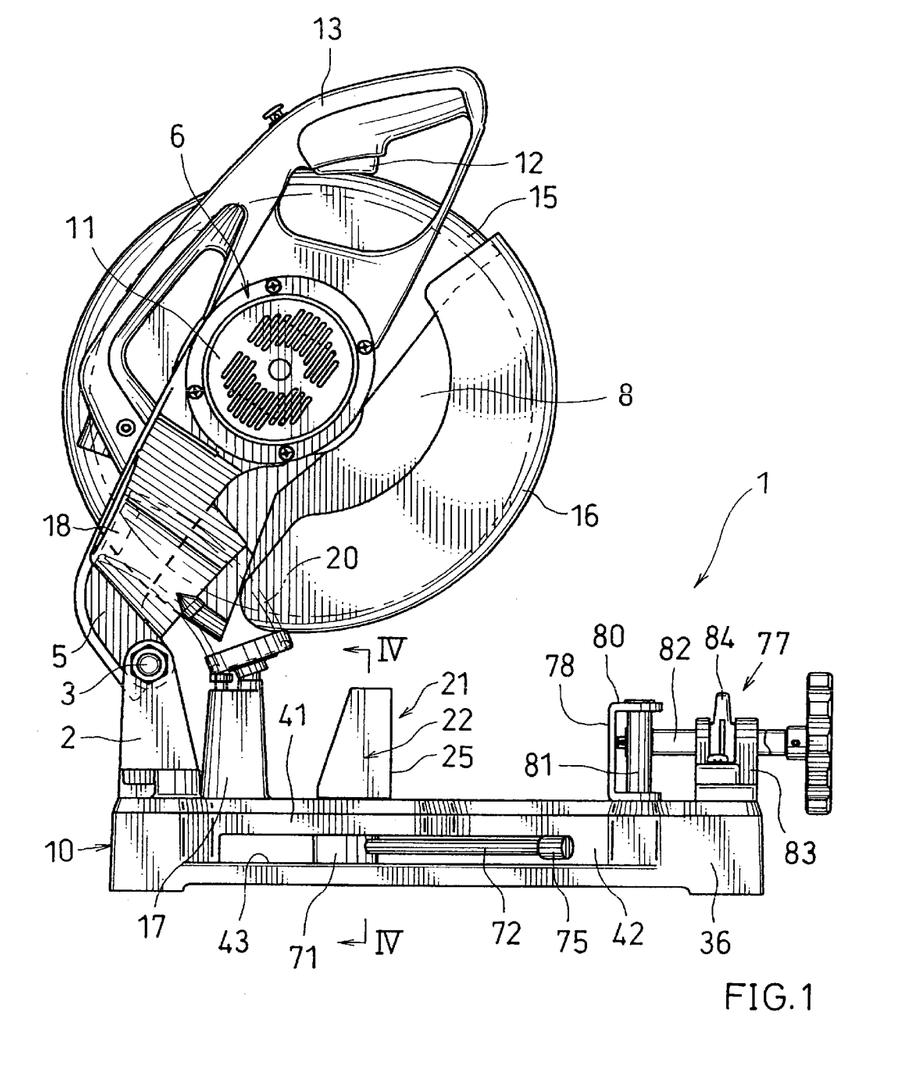
FIG. 1 is a left side view of a representative table saw having an improved adjustable fence.

A blade case 15 may be mounted on the motor housing 11 and may serve to cover substantially the upper half of the saw blade 8. A substantially arc-shaped safety cover 16 may be mounted on the blade case 15 and may pivot about the same axis as the motor shaft to cover and uncover substantially the lower half of the saw blade 8. A spring support bracket 17 may be mounted on the table 10 in a position forward of and adjacent to the support bracket 2. A spring 20 may be interposed between the spring support bracket 17 and a spring seat 18 that is mounted on the saw unit 5, so that the saw unit 5 is normally biased upward.

In order to cut a workpiece (not shown) placed on the table 10, the operator starts the motor 6 by the operation of the trigger 12 to rotate the saw blade 8 and, using the handle 13, presses the saw unit 5 downward against the biasing force of the spring 20. In response to the downward movement of the saw unit 5, the safety cover 16 preferably rotates to uncover the saw blade 8. As a result, the saw blade 8 can cut the workpiece.

Figure 2:
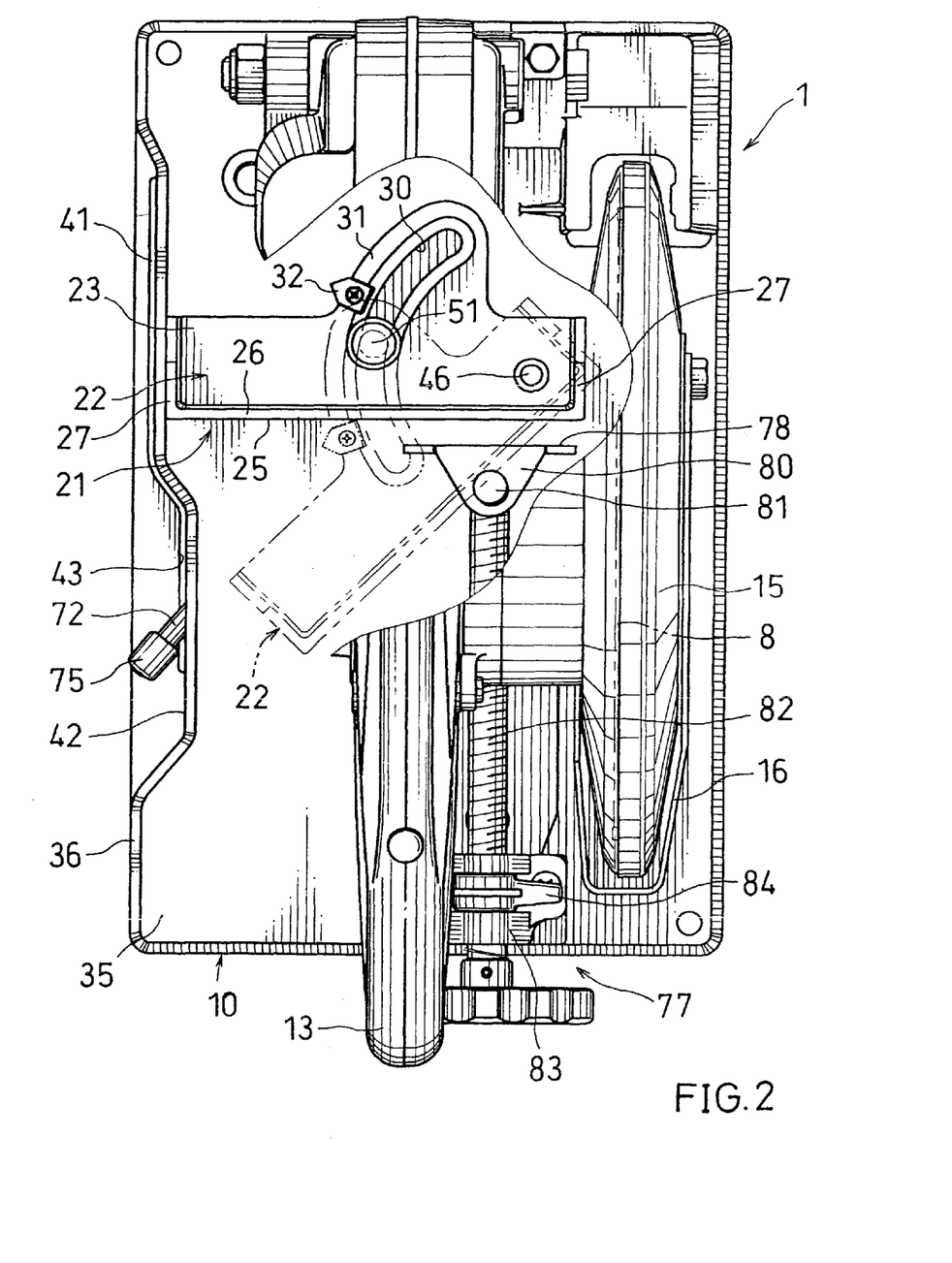
FIG. 2 is a plan view of the representative table saw.
Figure 4:
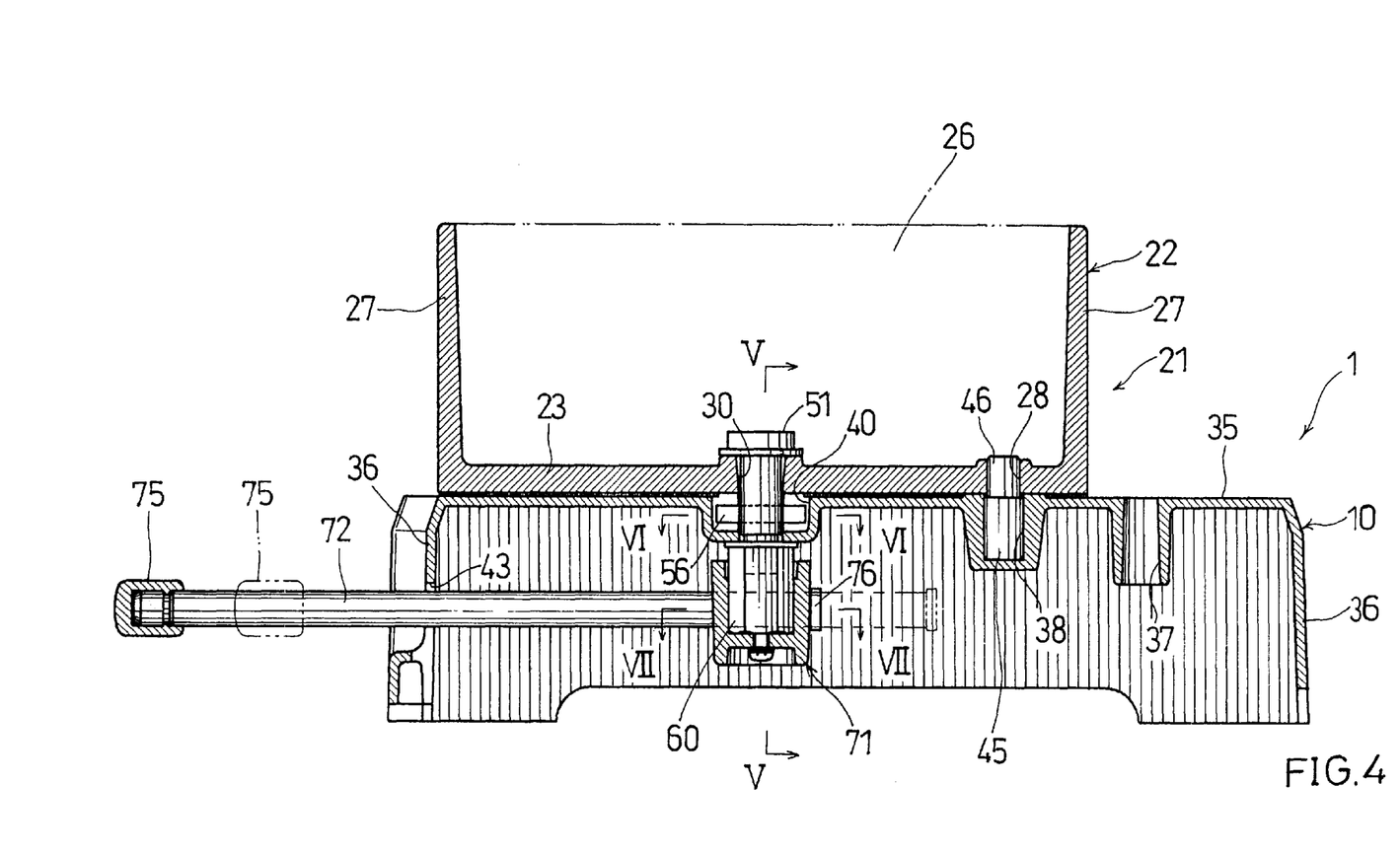
FIG. 4 is a sectional view taken along line IV—IV in FIG. 1.

As shown in FIGS. 1, 2 and 4, an adjustable fence 22 may be disposed on the table 10 in a position forward of and adjacent to the spring support bracket 17. The fence 22 may comprise a mounting plate 23, a workpiece abutting plate 26 and right and left end plates 27. The mounting plate 23 may contact the upper surface of the table 10 in surface-to-surface contact relationship therewith. The abutting plate 26 may be disposed on the front end of the mounting plate 23 to extend vertically in the upward direction from mounting plate 23, thereby defining a reference surface 25 for contacting the workpiece. The right and left end plates 27 may be disposed on the right and left ends of the mounting plate 23 and may extend vertically in the upward direction from the mounting plate 23, so that each of the end plates 27 intersect the abutting plate 26 at a right angle.

As shown in FIG. 4, a pin insertion hole 28 may be formed in the right end portion of the mounting plate 23. A substantially arc-shaped guide slot 30 may be formed in the mounting plate 23, which guide slot extends along an arc about the pin insertion hole 28. As shown in FIG. 2, the rear portion (upper portion as viewed in FIG. 2) of the guide slot 30 may extend into a rear protrusion 31 formed on the rear side of the mounting plate 23. An indicator 32 may be mounted on the left side base portion of the rear protrusion 31. A scale (not shown) may be marked on the upper surface of the table 10, so that the indicator 32 will indicate the pivotal angle of the fence 22.

Figure 3:
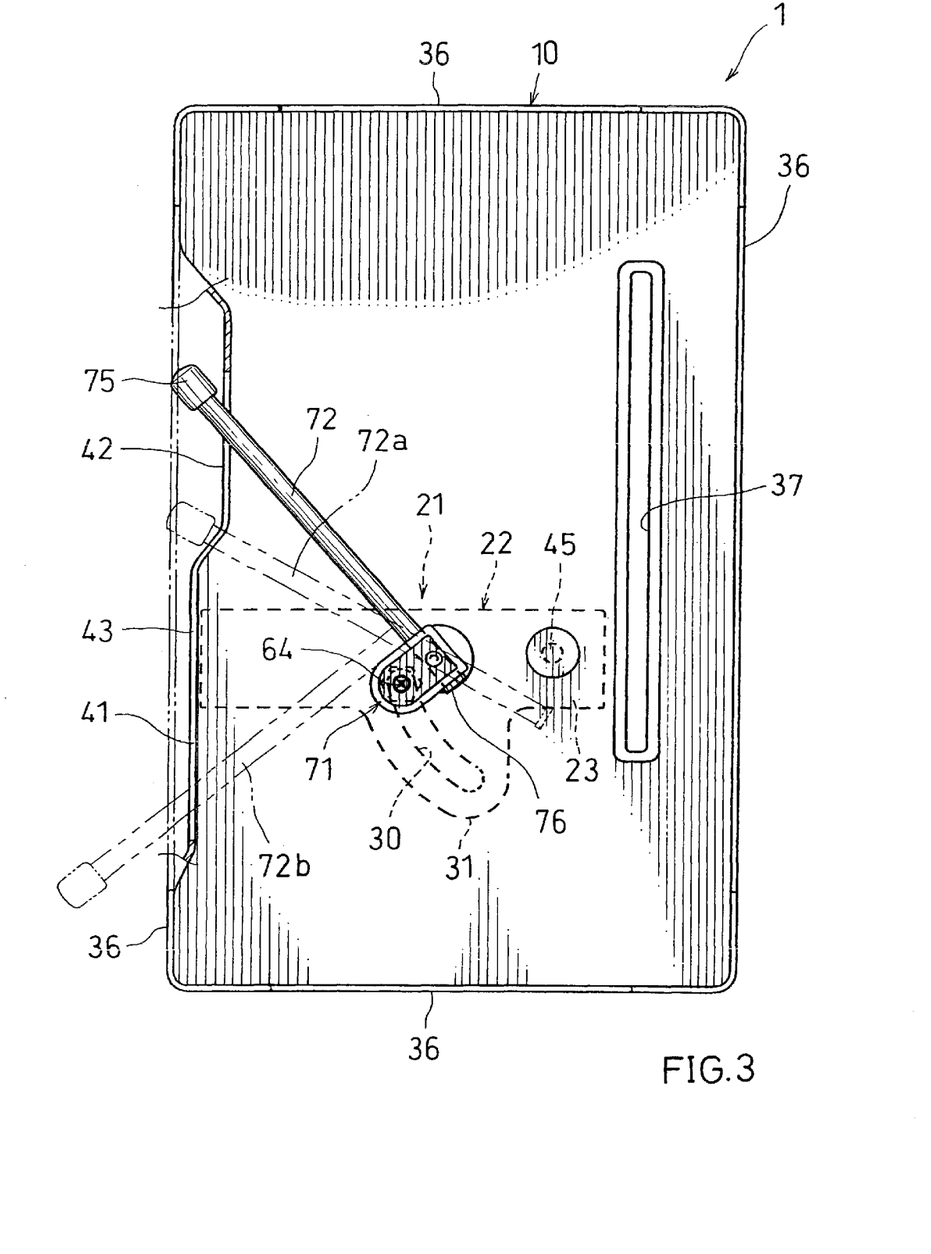
FIG. 3 is a broken-away bottom view of the representative table saw.

As shown in FIGS. 3 and 4, the table 10 may comprise a horizontal plate 35 and four sidewalls 36. The horizontal plate 35 has an upper surface that defines the table surface. The sidewalls 36 extend vertically in the downward direction from front, rear, right and left side ends of the horizontal plate 35.

As shown in FIG. 3, a blade intrusion slot 37 may be formed in the horizontal plate 35 on the right side thereof and extend in the forward and rearward directions. A substantially cylindrical pin receiving recess 38 may be formed in the horizontal plate 35 leftward of and adjacent to the front portion of the intrusion slot 37. A bolt engaging recess 40 may be formed to the left of the pin receiving recess 38.

Referring to FIGS. 1 and 2, the left rear half of the side wall 36 may include a shallow recessed wall part 41 with a bottom and the left front half of the side wall 36 may include a deep recessed wall part 42 with a bottom. The recessed wall parts 41 and 42 are continuously formed and non-recessed wall parts are also formed at the front and rear ends of the left sidewall 36. A horizontal lever slit or opening 43 may be formed through and between the recessed wall parts 41 and 42.

As shown in FIG. 4, a pin 45 may be fixedly inserted into the pin receiving recess 38 and may have an upper end that extends upwardly from the horizontal plate 35 or the table surface. The upper end of the pin 45 may be rotatably inserted into the pin insertion hole 28 of the fence 22, so that the fence 22 can pivot around the pin 45 as indicated by chain lines in FIG. 2.

Figure 5:
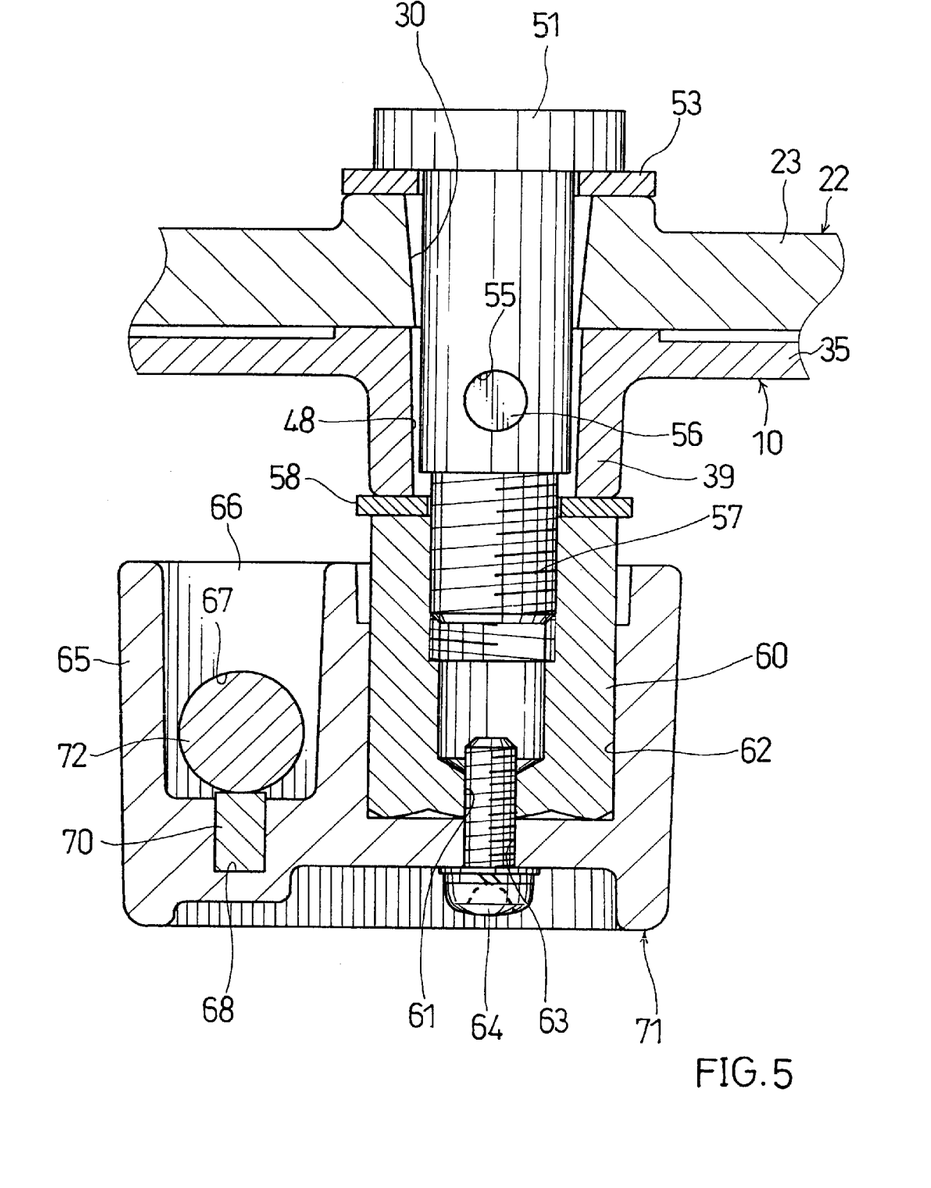
FIG. 5 is a sectional view taken along line V—V in FIG. 4.
Figure 6:
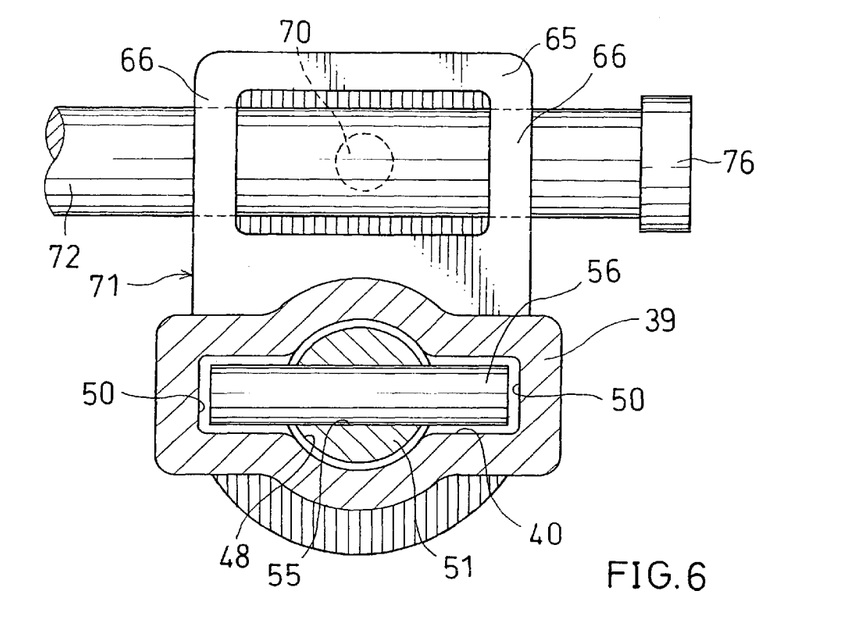
FIG. 6 is a sectional view taken along line VI—VI in FIG. 4.

As shown in FIGS. 4 to 6, a downward extending flange 39 may be formed on the lower surface of the horizontal plate 35 and may have the bolt engaging recess 40 with a bottom formed therein, so that the bolt engaging recess 40 is positioned on the central line of the arc-shaped guide slot 30. The bolt engaging recess 40 may include a substantially cylindrical bolt insertion hole 48 that extends through the bottom of the bolt engaging recess 40. A pair of lateral engaging recesses 50 may be formed on each of the right and left sides of the engaging recess 40 in communication with the bolt insertion hole 48.

As shown in FIG. 5, a bolt 51 may be inserted into the guide slot 30 of the fence 22 with an upper washer 53 interposed between the head of the bolt 51 and the upper surface of the fence 22. A pin insertion hole 55 may be formed in the shank of the bolt 51 in its diametrical direction, so that it is aligned with the lateral engaging recesses 50 of the bolt engaging recess 40. An engaging pin 56 may be slidably or forcibly inserted into the pin insertion hole 55 and both ends of the engaging pin 56 may extend outwardly from the bolt 51 and engage the lateral engaging recesses 50. As a result, the bolt 51 is prevented from rotating around its axis relative to the horizontal plate 35. The shank of the bolt 51 may have a male thread portion 57 that extends below the horizontal plate 35 of the table 10.

A hexagonal nut 60 with a bottom may be engaged with the male thread portion 57 with a lower washer 58 interposed between the lower end of the flange 39 and the upper end of the nut 60. FIG. 5 shows the nut 60 in the tightened state. A threaded hole 61 may be formed in the bottom of the nut 60.

Figure 7:
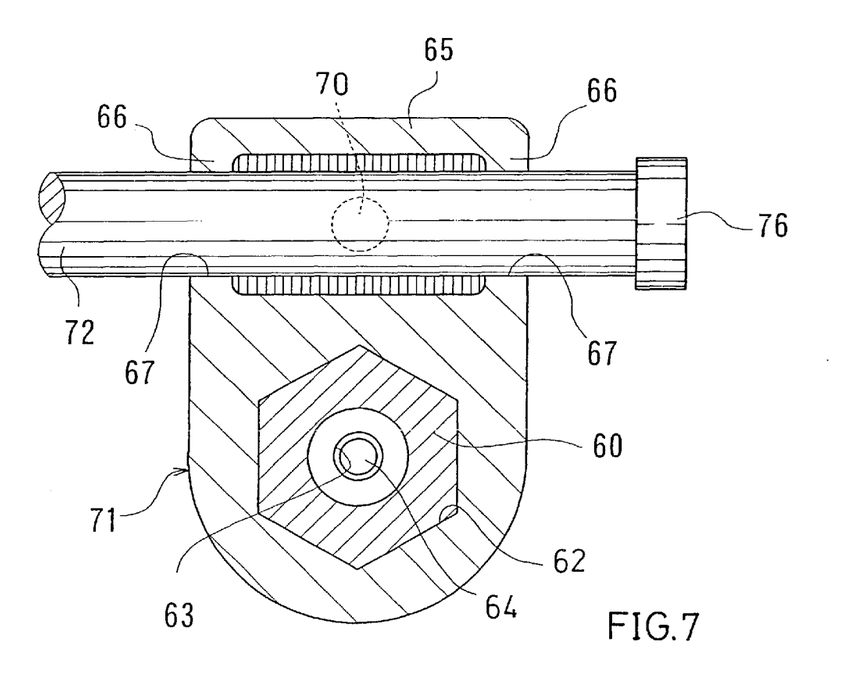
FIG. 7 is a sectional view taken along line VII—VII in FIG. 4.

As shown in FIGS. 5 and 7, a nut holder 71 may have a hexagonal engaging hole 62 for engaging the nut 60. A screw insertion hole 63 may be formed in the bottom of the engaging hole 62 and may be positioned on the same axis as the central axis of the engaging hole 62. A screw 64 may be inserted into the insertion hole 63 and may engage the threaded hole 61 of the nut 60, so that the nut holder 71 can be fixed in position relative to the nut 60.

The nut holder 71 may have a downwardly recessed lever mounting portion 65 on the lateral side of the engaging hole 62. The lever mounting portion 65 may have a substantially rectangular configuration and may have a pair of lever support walls 66 that are spaced from each other. The support walls 66 may have lever insertion holes 67 that have the same diameter and are aligned with each other. As shown in FIG. 5, a resistance member 70, preferably made of rubber, may be fitted into a recess 68 formed in the bottom of the mounting portion 65 such that an upper portion of the resistance member 70 extends upwardly from the bottom of the mounting portion 65.

Lever 72 may have a circular configuration in section and may be inserted into the lever insertion holes 67 through the slit 43 formed in the left side wall 36 of the table 10 (see FIGS. 3 and 4). The lever 72 may have a distal end that extends outward from the left sidewall 36. A grip 75 may be mounted on the distal end of the lever 72. The lever 72 may have a proximal end opposite to the distal end, which proximal end extends outward from the holder 71 and may have a removal prevention plug 76 mounted thereon.

The operation of the machining tool 1 will now be described. When the lever 72 is moved forward (upward as viewed in FIG. 3) along the slit 43 to pivot the lever 72 around the bolt 51 from a releasing position to a fixing position, which fixing position is indicated by solid lines in FIG. 3, the nut holder 71 and the nut 60 are rotated in such a direction that the nut 60 is tightened against the bolt 51. As a result, the fence 22 can be fixed in position relative to the horizontal plate 35 of the table 10.

On the other hand, when the lever 72 is moved rearward (downward as viewed in FIG. 3) from the fixing position to the releasing position, the nut 60 may be loosened, so that the fence 22 can pivot about the pin 45. As a result, the angular position of the fence 22 relative to the horizontal plate 35 or the table 10 can be changed. After the fence 22 has been set to the desired angular position, the lever 72 is returned to the forward position, so that the fence 22 can be fixed in position relative to the table 10 in the desired angular position.

Because the lever 72 is slidably inserted into the lever insertion holes 67 of the lever support walls 66 of the holder 71, the effective length of the lever 72 or the length between the grip 75 and the holder 71 can be changed. Thus, when the lever 72 is in the releasing position as indicated by reference numeral 72b, the lever 72 may be pulled so that the grip 75 is outside of the recess formed by the shallow recessed wall part 41. When the lever 72 is fully extended, the operator can easily pivot the lever 72. On the other hand, when the lever 72 is in the position between the fixing position and in the position as indicated by reference numeral 72a, which just before completion of the tightening of the nut 60, the lever 72 may be pushed under the table 10 so that the grip 75 is positioned within the recess formed by the deep recessed wall part 42. The frictional resistance caused by the resistance member 70 resiliently contacting the lever 72 will hold the axial position of the lever 72.

As shown in FIGS. 1 and 2, the machining tool 1 also may include a vice device 77 that is disposed at the front end of the table 10 and that can be utilized together with the fence 22 to fix the workpiece in position on the table 10. The vice device 77 is known as a quick vice. The construction of the vice device 77 will therefore be briefly explained. The vice device 77 may comprise a vice plate 80, a vice screw 82, a screw guide 83 and a vice nut 84. The vice plate 80 may have clamp surface 78 that is positioned opposite to the reference surface 25 of the fence 22. The vice plate 80 may be rotatably connected to a vice screw 82 by means of a pin 81. The screw guide 83 may be fixed to the upper surface of the table 10 and may rotatably support the vice screw 82. The vice nut 84 may be supported by the screw guide 83 and may be shifted between a first position for engagement with the vice screw 82 and a second position for disengagement from the vice screw 82.

In the representative embodiment of FIGS. 1 to 7, the nut 60 can be tightened and loosened by the movement of the lever 72. Therefore, the fence 22 can be fixed in position relative to the table 10 without using a special tool. Consequently, the adjustment operation for determining the angular position of the fence 22 can be easily performed.

In addition, because the lever 72 is disposed below the table 10, the space below the table 10 can be efficiently utilized. Thus, it is not necessary to provide space so that a tool can be utilized to loosen and tighten the nut, as in known machining tools having adjustable fences.

Further, because the effective length or the length between the grip 75 and the holder 71 can be varied, the operator can move the lever 72 to each desired position. Thus, when the operator is not using the lever 72, the grip 75 may be positioned in the storage position within either of the recessed wall parts 41 and 42 of the sidewall 36 of the table 10. Therefore, the lever 72 will not interfere the operation of the saw unit 5 or other devices.

Furthermore, because the resistance member 70 is provided to cause frictional resistance against the axial movement of the lever 72, the lever 72 will not shake or move accidentally in the axial direction.

The above representative embodiment may be modified in various ways. For example, although the fence 22 of the above representative can pivot around a pivotal axis, a fence also may be movable along a linear path with the aid of an appropriate slide mechanism. In such a case, the position of the fence may be adjusted along the linear path. Further, although the bolt 51 is fixed in its rotational position relative to the table 10 and the nut 60 is connected to the lever 72 for rotation therewith, the bolt 51 and the nut 60 may be replaced by a nut and a bolt, respectively.

Further, the lever 72 may be directly connected to the nut 60 or may be formed integrally with the nut 60. In such a case, the holder 71 can be eliminated. When the bolt 51 and the nut 60 are replaced with a nut and a bolt, respectively, the lever 72 may be connected to the head of the bolt. In addition, the resistance member 70 may be mounted on the lever 72 so as to frictionally contact the holder 71. Furthermore, the resistance member 70 may be a coil, leaf spring, brush or any other appropriate device for providing frictional resistance.

What is claimed is:

1. A machining tool comprising:
a table;
an adjustable fence disposed on the table;
a fixing device coupled to the adjustable fence, the fixing device having at least a first position for fixing the adjustable fence in a desired position relative to the table and a second position for permitting the adjustable fence to move relative to the table; and,
a lever disposed below the table and coupled to the fixing device for moving the fixing device from the first position to the second position.

2. A machining tool as defined in claim 1 wherein the length of said lever is adjustable.

3. The machining tool as in claim 1, wherein the machining tool is a circular saw that includes a saw unit, which saw unit has a circular saw blade and can vertically pivot relative to the base.

4. The machining tool as in claim 3, wherein the fence and the saw unit are disposed on the upper side of the table opposite to the lever.

5. A machining tool comprising:
a table;
an adjustable fence disposed on the table;
a fixing device coupled to the adjustable fence, the fixing device having at least a first position for fixing the adjustable fence in a desired position relative to the table and a second position for permitting the adjustable fence to move relative to the table, and
a lever coupled to the fixing device, the lever permitting an operator to move the fixing device from the first position to the second position,
wherein the fixing device includes a first screw member and a second screw member that engages the first screw member, the first screw member being fixed in position relative to the table, and the second screw member being connected to the lever, wherein the lever rotates the second screw member.

6. A machining tool as defined in claim 5 wherein the first screw is a male screw that extends through the adjustable fence and the table and has a head engaging an upper surface of the adjustable fence, and the second screw is a female screw that engages the male screw at a position below the table and has an upper end that contacts the lower surface of the table.

7. A machining tool comprising:
a table;
an adjustable fence disposed on the table;
a fixing device coupled to the adjustable fence, the fixing device having at least a first position for fixing the adjustable fence in a desired position relative to the table and a second position for permitting the adjustable fence to move relative to the table,
a lever coupled to the fixing device, the lever permitting an operator to move the fixing device from the first position to the second position, and,
an adjusting device permitting the adjustment of an extending length of the lever from the fixing device;
wherein the adjustment device includes a holder provided on the fixing device so as to hold the lever, wherein the lever can be axially moved relative to the holder and can be pivoted in unison with the holder.

8. A machine tool comprising:
a table;
an adjustable fence disposed on the table;
a fixing device coupled to the adjustable fence, the fixing device having at least a first position for fixing the adjustable fence in a desired position relative to the table and a second position for permitting the adjustable fence to move relative to the table, and
a lever coupled to the fixing device, the lever permitting an operator to move the fixing device from the first position to the second position, said lever including a holder on the fixing device so as to hold the lever, wherein the lever can be axially moved relative to the holder and can be pivoted in unison with the holder, and,
an adjustment device permitting the adjustment of the length of said lever,
wherein the holder comprises a pair of walls opposed in spaced relationship with each other and each including a mounting hole formed therein for axially slidable supporting the lever.

9. A machine tool comprising:
a table;
an adjustable fence disposed on the table;
a fixing device coupled to the adjustable fence, the fixing device having at least a first position for fixing the adjustable fence in a desired position relative to the table and a second position for permitting the adjustable fence to move relative to the table, and
an adjustable length lever coupled to the fixing device for moving the fixing device from the first position to the second position,
wherein the lever is disposed below the table and includes a grip end that is disposed on a side opposite to the holder, wherein the table has an opening formed in at least one side wall and the lever grip end extends outwardly from the wall through the opening.

10. A machining tool comprising:

a table;

an adjustable fence disposed on the table;

a fixing device coupled to the adjustable fence, the fixing device having at least a first position for fixing the adjustable fence in a desired position relative to the table and a second position for permitting the adjustable fence to move relative to the table, and an adjustable length lever coupled to the fixing device, the lever permitting an operator to move the fixing device from the first position to the second position, wherein the lever is disposed below the table and includes a grip end that is disposed on a side opposite to the holder, wherein the table has an opening formed in at least one side wall and the lever grip end extends outwardly from the wall through the opening, and, wherein the side wall includes a recess having a first shallow portion and a second deep portion, so that the lever in the fixing position extends across the recess through the slit, the grip end of the lever being positioned within the deep portion when the lever has a maximum effective length.

11. A table saw as defined in claim 10 wherein the side wall includes a second inwardly recessed wall part that is continuously formed with the first recessed wall part and has a second outer recess with a second bottom, so that the lever in the releasing position extends across the second inwardly recessed wall part through the slit, the lever in the releasing position being movable in the axial direction by means of the adjusting device between a storage position and an extended position, the grip end in the storage position being positioned within the second outer recess, and the grip end in the extended position being positioned outward of the second outer recess.

12. A machining tool comprising:

a table;

an adjustable fence disposed on the table;

a fixing device coupled to the adjustable fence, the fixing device having at least a first position for fixing the adjustable fence in a desired position relative to the table and a second Position for permitting the adjustable fence to move relative to the table, and a lever coupled to the fixing device, and an adjusting device for adjusting the length of the lever, the lever permitting an operator to move the fixing device from the first position to the second position, said adjusting device including a holder on the fixing device so as to hold the lever, wherein the lever can be axially moved relative to the holder and can be pivoted in unison with the holder, further including a resistance device provided between the lever and the holder, the resistance device causing a resistance against axial movement of the lever.

13. A machining tool as defined in claim 12 wherein the resistance device includes a resilient member that is mounted on the holder and contacts a lateral surface of the lever.

14. A machining tool comprising:

a table;

an adjustable fence disposed on the table;

a fixing device coupled to the adjustable fence, the fixing device having at least a first position for fixing the adjustable fence in a desired position relative to the table and a second position for permitting the adjustable fence to move relative to the table, and a lever coupled to the fixing device, the lever permitting an operator to move the fixing device from the first position to the second position, wherein the adjustable fence can be pivoted about a pivotal axis relative to the table, and the fixing device serves to fix and release the position of the fence around the pivotal axis, and the machining tool is a circular saw that includes a saw unit, which saw unit has a circular saw blade and can vertically pivot relative to the base.

15. An apparatus comprising:

a cutting tool, a work surface coupled to the cutting tool, an adjustable fence disposed on the work surface, a means for fixing a desired position of the adjustable fence, the position fixing means having at least a first position for fixing the adjustable fence in the desired position relative to the work surface and a second position for permitting movement of the adjustable fence relative to the work surface, and a means for moving the position fixing means from the first position to the second position without the use of a tool, wherein the means for moving the position fixing means from the first position to the second position without the use of a tool is a lever, and the apparatus is a circular saw that includes a saw unit, which saw unit has a circular saw blade and can vertically pivot relative to the base.

16. An apparatus as defined in claim 15 wherein the adjustable fence can be pivoted about a pivotal axis relative to the work surface and the position fixing means serves to fix and release the position of the adjustable fence around the pivotal axis.

17. An apparatus comprising:

a cutting tool, a work surface coupled to the cutting tool, an adjustable fence disposed on the work surface, a means for fixing a desired position of the adjustable fence, the position fixing means having at least a first position for fixing the adjustable fence in the desired position relative to the work surface and a second position for permitting movement of the adjustable fence relative to the work surface, and a means for moving the position fixing means from the first position to the second position without the use of a tool, wherein the means for moving the position fixing means from the first position to the second Position without the use of a tool is a lever and wherein the adjustable fence can be pivoted about a pivotal axis relative to the work surface and the position fixing means serves to fix and release the position of the adjustable fence around the pivotal axis, and, wherein the position fixing means comprises a male screw that extends through the adjustable fence and a female screw that contacts the lower surface of the work support, the female screw engages the male screw, the male screw is in a fixed position relative to the work support and has a head that contacts the upper surface of the adjustable fence and the female screw is coupled to the lever, wherein the lever rotates the female screw.

18. An apparatus as defined in claim 17 further comprising means for adjusting the length of the lever with respect to the female screw.

19. An apparatus as defined in claim 18 wherein the adjusting means comprises a holder connected to the position fixing means, the holder comprising a pair of opposing walls, each having mounting holes, and a resistance means, wherein the lever is inserted in the mounting holes so that the lever can move axially relative to the holder and can pivot in unison with the holder, wherein the resistance means is provided between the lever and the holder.

20. An apparatus as defined in claim 19 wherein the lever is disposed below the work support and comprises a grip disposed opposite to the holder, wherein the work support has an opening formed in a side wall and the lever grip extends outwardly from the wall through the opening, wherein the side wall comprises:

a first recess, wherein the lever in the fixing position extends across the first recess through the opening, the lever grip being positioned within the first recess when the lever has a maximum effective length, and a second recess that is continuously formed with the first recess, wherein the lever in the releasing position extends across the second recess through the opening, the lever in the releasing position being movable in the axial direction by the adjusting means between a storage position and an extended position, the lever grip in the storage position being positioned within the second recess, and the lever grip in the extended position being positioned outward of the second recess.

21. An apparatus comprising:

a cutting tool;

a work support coupled to the cutting tool;

an adjustable fence disposed on the work support;

a means for fixing a desired position of the adjustable fence, the position fixing means having at least a first position for fixing the adjustable fence in the desired position relative to the work support and a second position for permitting movement of the adjustable fence relative to the work support; and, a means for moving the position fixing means from the first position to the second position without the use of a tool, wherein the means for moving the position fixing means from the first position to the second position without the use of a tool is a lever disposed below the work support.

* * * * *